United States Patent [19]

Wada

[11] 4,419,899
[45] Dec. 13, 1983

[54] ELECTROMAGNETIC FLOW METER

[75] Inventor: Ichiro Wada, Yokohama, Japan

[73] Assignee: Tokyo Shibaura Denki Kabushiki Kaisha, Kawasaki, Japan

[21] Appl. No.: 360,420

[22] Filed: Mar. 22, 1982

[30] Foreign Application Priority Data

Apr. 30, 1981 [JP] Japan .............................. 56-63510[U]

[51] Int. Cl.³ .............................................. G01F 1/58
[52] U.S. Cl. .................................... 73/861.12; 174/78
[58] Field of Search ............. 73/861.12; 174/78, 84 S; 361/215

[56] References Cited

U.S. PATENT DOCUMENTS 3,278,883 10/1966 Lipsey .............................. 174/78 X
3,963,856 6/1975 Carlson et al. ................. 361/215 X

FOREIGN PATENT DOCUMENTS 38-22047 10/1963 Japan .
946474 1/1964 United Kingdom ................ 174/845
1111981 5/1968 United Kingdom ............. 73/861.12

Primary Examiner—Gerald Goldberg
Assistant Examiner—Brian Tumm
Attorney, Agent, or Firm—Schwartz, Jeffery, Schwaab, Mack, Blumenthal & Koch

[57] ABSTRACT

An electromagnetic flow meter includes an electromagnetic flow meter body having a connecting end for connecting to a pipe in which fluid to be metered is conducted, and a grounding device held between the connecting end of the body and the pipe, the grounding device having an annular frame of an insulating material having an inner periphery defining a central opening and an outer periphery and a grounding wire disposed at least at the inner periphery to be exposed to the central opening of the annular frame.

17 Claims, 17 Drawing Figures 4,419,899

ELECTROMAGNETIC FLOW METER

BACKGROUND OF THE INVENTION

1. Technical Field of the Disclosure

The present invention relates to an electromagnetic flow meter, and more particularly an electromagnetic flow meter having a grounding means improved and adapted for metering the flow of a highly corrosive liquid.

2. Description of the Prior Art

In the field of electromagnetic flow meters, it is known to measure the flow of an electrically conductive or semi-conductive liquid in a pipeline by utilizing the phenomenon that an electric conductor moving in a magnetic field induces an electromotive force, the value of which is proportional to the movement of the conductor. In known devices based on this principle, the liquid flows through a pipeline placed in a uniform magnetic field, so that its axis is at right angles to the lines of force of the field. Arranged diametrically opposite to one another in the wall of the pipeline are two electrodes, so that the connecting pipeline is about at right angles to the lines of force. Due to the flow of the liquid, a voltage is induced between the electrodes, which is substantially proportional to the flow of the liquid and which is measured.

In the electromagnetic flow meter, a grounding means is indispensable from the standpoint of improving the electrical characteristics. Effective grounding of the electromagnetic flow meter is necessary for maximum accuracy. If the connecting pipelines are provided with corrosion-resistant internal coats or linings, or are completely of plastic, the connection to the counterflanges fails to achieve reliable grounding. A grounding means or grounding ring must be mounted on the inlet or outlet side of the electromagnetic flow meter body. The grounding ring, that is, the ring-shaped liquid-contacting electrode, comprises a grounding plate and a liquid-contacting electrode and is frequently sandwiched between the electromagnetic flow meter body and a mating pipe section of some plant pipeline.

Now, the grounding ring may be made of SUS 304 or 316 stainless steel, which is relatively inexpensive, in the case where the fluid to be metered is water or a slightly corrosive liquid. In case the fluid to be metered is a highly corrosive liquid such as potassium hydroxide (KOH), sodium hydroxide (NaOH), sulfuric acid ($H_2SO_4$) or hydrochloric acid (HCl), however, it is difficult to use the SUS 316 stainless steel, as will be explained in the following Table, so that an extremely expensive material such as platinum-iridium, platinum or tantalum, which is highly corrosion resistant, is frequently used:

| Name of Chemical | Concentration | Temperature | Material |  |  |  |
|---|---|---|---|---|---|---|
|  |  |  | Pt—Ir | Ir | Ta | SUS316 |
| HCl | 10% | Room Temp. | A | A | A | C |
|  | 20% |  |  |  |  |  |
|  | 35% | Boiling Point | C | A | A | C |
| $H_2SO_4$ | 10% | Room Temp. | A | A | A | A |
|  | 60% |  |  |  |  |  |
|  | 80% |  |  |  |  |  |
|  | 5% | Boiling Point | A | A | A | C |
|  | 95% |  |  |  |  |  |
| $HNO_3$ | 10% | Room Temp. | A | A | A | A |
|  | 30% |  |  |  |  |  |
|  | 60% |  |  |  |  |  |
|  | 10% | Boiling Point | A | A | A | C |
|  | 30% |  |  |  |  |  |
|  | 60% |  |  |  |  |  |
| Aqua Regia | HCl:3 HNO$_3$:1 | Room Temp. | C | C | A | C |
| Caustic Soda | 20% | Room Temp. | A | A | B | B |
|  | 20% | Boiling Point | A | A | C | B |
|  | 40% | Room Temp. |  |  |  |  |
|  | | Boiling Point | A | A | C | — |

In the above Table, letters A, B and C designate "completely corrosion resistant", "usable" and "corroded", respectively. The platinum-iridium is a mixture containing 80 wt. % of platinum and 20 wt. % of iridium.

According to the prior art, the grounding ring has to be made of an expensive material from the standpoint of corrosion resistance. Accordingly, the propriety of the material has to be taken into consideration in view of the amount of the material used and the construction of the grounding ring. In short, the ring-shaped, liquid-contacting electrode according to the prior art cannot avoid an increase in its production cost and is not proper for industrial application because it requires a large amount of expensive material. In one of the liquid-contacting electrodes according to the prior art, on the other hand, screw-shaped electrodes made of an expensive material are used together with a ring of an insulating material. The screw-shaped electrodes are made of platinum-irridium, tantalum or the like. The reason why the platinum-iridium is used in place of platinum is that the corrosion resistance of platinum is superior to the platinum-iridium, but pure platinum is too soft to be used in the screw-type electrode. Here, the platinum-iridium has its hardness augmented by mixing platinum with about 20 wt. % of iridium, but it suffers several defects, namely, that it is inferior in its corrosion resistance to platinum and that it is far more expensive than platinum. For example, in case of using the screw-type platinum-iridium, the amount of the material is about 32 g for 8 electrodes.

SUMMARY OF THE INVENTION

Therefore, it is an object of the present invention to provide a novel and improved electromagnetic flow meter which can allow its grounding means to sufficiently perform the function by using a small amount of an expensive material having excellent corrosion resistance.

It is another object of the invention to provide a novel electromagnetic flow meter in which there can be mounted a grounding means without requiring a high degree of hardness of the conductor.

It is a further object of the invention to provide a novel electromagnetic flow meter which has a grounding means having a wire-shaped electrode made of a less expensive platinum-containing material, without increased hardness.

It is a still further object of the invention to provide a novel electromagnetic flow meter which has a grounding means adaptable for metering the flow of a highly corrosive fluid without failure over a long time period.

It is also an object of the invention to provide an electromagnetic flow meter wherein the conductive area of the grounding means can be easily adjusted in accordance with the conductivity of the fluid having its flow measured.

In accomplishing the foregoing objects, there has been provided according to the invention an electromagnetic flow meter comprising a flow meter body having at least one connecting end for connecting to one end of a pipe in which the flow of a fluid is to be metered, and grounding means held between the connecting end of the body and the pipe, the grounding means comprising an annular frame of an insulating material having an inner periphery defining a central opening and an outer periphery, and a grounding wire disposed at least at the inner periphery to be exposed to the central opening of the annular frame.

Other objects, features and attendant advantages of the invention will become readily apparent as the method and the apparatus become better understood by reference to the following detailed description of preferred embodiments, when considered in connection with the accompanying drawings.

BRIEF DESCRIPTION OF THE DRAWINGS

In the drawings, forming a part hereof, in which like reference characters denote like parts in the various views.

DETAILED DESCRIPTION OF PREFERRED EMBODIMENTS

The present invention will now be described in connection with the embodiments thereof with reference to the accompanying drawings.

Figure 1:
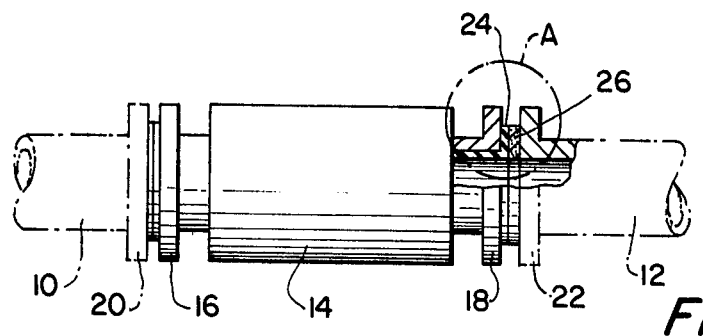
FIG. 1 is a side view, partly broken away, of an electromagnetic flow meter connected between pipe sections of a pipeline according to a preferred embodiment of the invention.

In FIG. 1, a flow meter is installed between mating pipe sections 10 and 12, extending to the right and left as part of a plant pipeline. The electromagnetic flow meter body 14 is equipped with a grounding means and will be described in detail hereinafter. An area A appearing in FIG. 1 is shown in an enlarged scale in FIGS. 2 and 3. The construction and operation of the flow meter body 14 is conventional and will not be explained in detail. Reference is made to the prior art, e.g., Japanese Utility Model No. 38-22047, the disclosure of which is hereby incorporated by reference.

Figure 2:
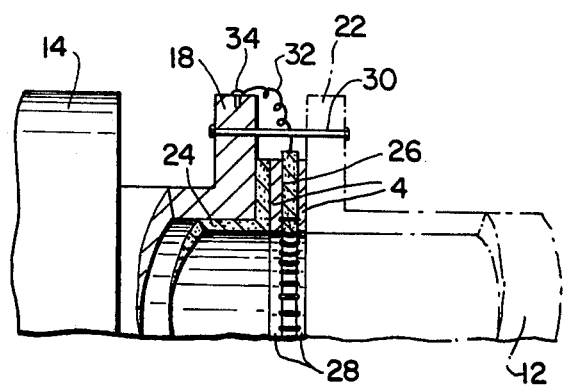
FIGS. 2 and 3 are enlarged side views, partly in section, showing the first and second constructions of connecting to the pipe according to preferred embodiments of the invention.

Referring first to FIG. 2, the body 14 has flanges 16 and 18 at both ends to enable it to be connected with flanges 20 and 22 of the mating pipe sections 10 and 12.

The body 14 is provided with a lining 24 on its inner surface. The grounding means or grounding ring 26 is sandwiched between the mating pipe section 12 and the electromagnetic flow meter body 14 with intermediate packings 28. The flange 18 of the body 14 and the flange 22 of the pipe section 12 are coupled together by fastening bolts 30. A grounding connector 32 from the grounding ring 26 is anchored on the flange 16 of the electromagnetic flow meter body 14 by a fastening bolt 34.

Figure 3:
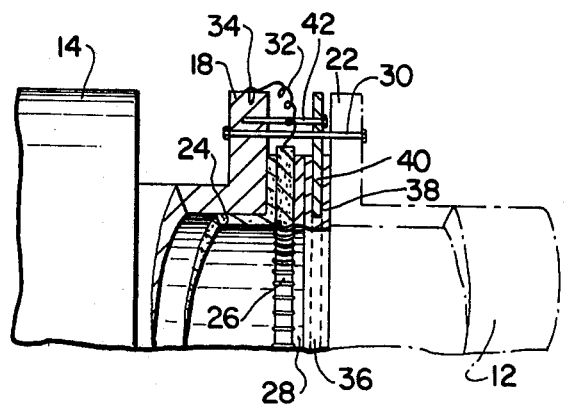

Turning to FIG. 3, a protector ring 36 is juxtaposed through the packing 28 in the grounding ring 26 on its one side, i.e., on the side of the mating pipe section 12 to thereby protect the grounding ring 26 from a mechanical impact. The protector ring 36 is prepared by applying a lining 38 to the outer surface of the inner side of a protector frame 40. The protector ring 36 is fastened to the flange 18 of the body 14 by bolts 42, one of which is shown.

Figure 4:
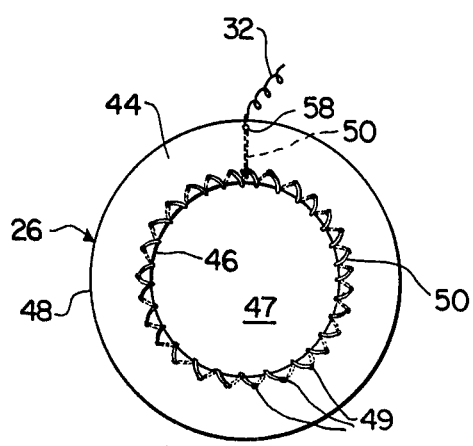
FIG. 4 is a front view of grounding means according to a preferred embodiment of the invention.
Figure 5:
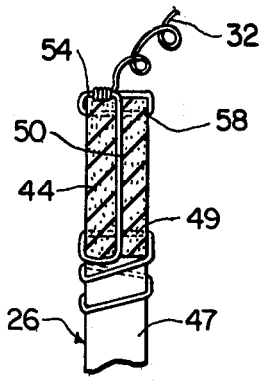
FIG. 5 is an enlarged sectional side view of the grounding means of FIG. 4.
Figure 6:
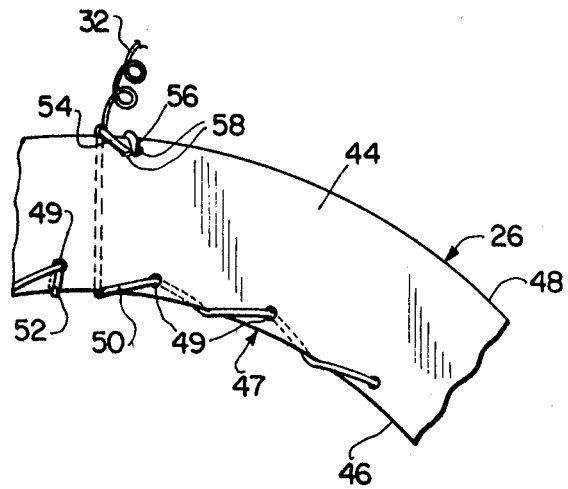
FIG. 6 is an enlarged front view of the grounding means of FIG. 4.

Next, FIGS. 4 to 12 are various embodiments of the grounding ring 26 of FIGS. 2 and 3. As shown in FIGS. 4, 5 and 6, an annular frame 44 having a ring shape has an inner periphery 46 defining a central opening 47 and an outer periphery 48, and is constructed by forming through holes 49, which are equidistantly arranged along the inner peripheral edge 46 thereof. A grounding wire 50 is then threaded through holes 49 in order, each time passing over the side surface of the frame 44, through one of the holes 49, around the back of the frame 44 and through the central opening 47, until it is wound on the inner peripheral edge 46 of the frame 44.

Grounding means 26 has the grounding electrode or the grounding wire 50 wound along the inner periphery including the part of the grounding wire 50 which passes across the inner edge surface 46 of the frame 44 and the adjacent portions of the side surfaces of the frame 44, which functions as an actual grounding electrode.

As shown in FIGS. 5 and 6, the grounding wire 50 has its one end 52 fixedly secured at one end of the through holes 49 and its other end 54 fixed to an attachment means 56, which is formed by a special through hole 58 positioned near the outer peripheral edge portion 48 of the frame 44. From there it is led out to the outside through the grounding connector 32. The grounding connector 32 is connected with the end portion 54 of the grounding wire 50 by means of winding and welding.

The annular frame 44 thus constructed is made of a highly corrosion resistant plastic, such as a tetrafluoroethylene resin, a monochlorotrifluoroethylene resin, or a copolymer of tetrafluoroethylene and hexafluoroethylene, and the annular frame 44 functions as an insulation bobbin for the grounding wire 50.

On the other hand, since the grounding wire 50 is prepared by the process of winding a thin wire, it does not require a high hardness and there can be used platinum wire of 0.3 mm diameter, for example, having excellent corrosion resistance. Moreover, as shown in FIG. 4, since the grounding wire 50 provides the electrode of the grounding means 26, the area of the liquid-contacting portion can be increased if the grounding wire 50 is wound in a different shape, e.g., a zigzag shape. The area of the liquid-contacting portion can be varied depending upon the value of the electrical conductivity of the fluid to be metered, and the liquid-contacting area of the grounding means 26 must be widened for a liquid having a lower electrical conductivity. It is possible to provide an electromagnetic flow meter which can have the area of its liquid-contacting portion freely varied and which can thereby enlarge its applicable range.

Except for the grounding wire 50 disposed in the grounding wire leadout hole 78, most of the grounding wire can be used as the grounding electrode, and the grounding wire itself is made so thin that it can be made of a small amount of platinum or the like. The amount of platinum for use as the grounding electrode having a diameter of 0.03 mm and a length of 600 mm is about 0.015 g.

Accordingly, the sealing between the packings 28 and the grounding means 26 can be accomplished by means of merely tightening the bolt 30.

Figure 7:
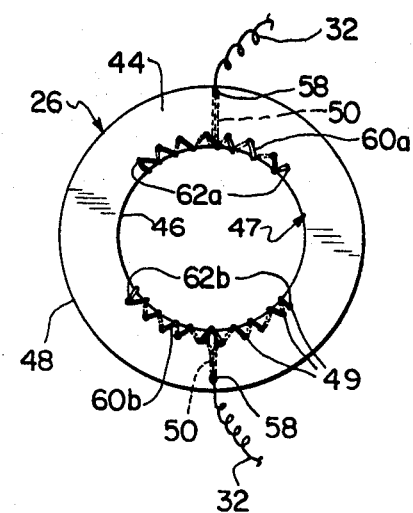
FIGS. 7, 8, 9 and 10 are front views of grounding means according to other embodiments of the invention.

FIG. 7 shows a construction in which the grounding wire 50 is divided into two halves which are wound on opposite sides of the inner peripheral edge 46 of the frame 44. Specifically, the grounding ring 26 is prepared by forming the through holes 49, which are equidistantly arranged within a predetermined range on the area adjoining the inner peripheral edge 46 of the annular frame 44 and by winding the divided grounding wires 60a and 60b in a manner similar to that of FIG. 4, until their ends are fixedly wound upon the grounding wire attachment means 62a and 62b.

Figure 8:
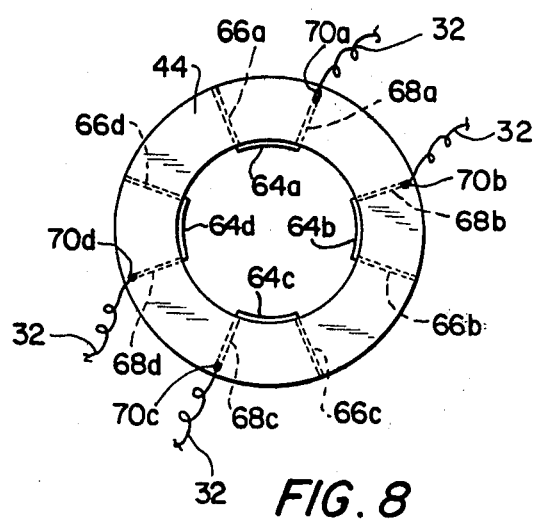

Next, FIG. 8 shows a construction, in which four divided grounding wires 64a, 64b, 64c and 64d are attached to the inner peripheral surface portions of the annular frame 44 such that they can contact with the liquid. In this embodiment, one end 66a, 66b, 66c or 66d of each grounding wire is attached radially to the side surface of the annular frame 44, whereas the other end 68a, 68b, 68c or 68d is attached radially at a distance from the first end, but also to the side surface of the frame 44 and then is fixed to the grounding wire attachment means or hole 70a, 70b, 70c or 70d. The attachment of the grounding wires 64a, 64b, 64c and 64d to the frame 44 is effected by the use of a suitable adhesive, such as, for example, a silicone adhesive. Both ends of grounding wire 64a, 64b, 64c and 64d may penetrate radially through the annular frame 44.

Figure 9:
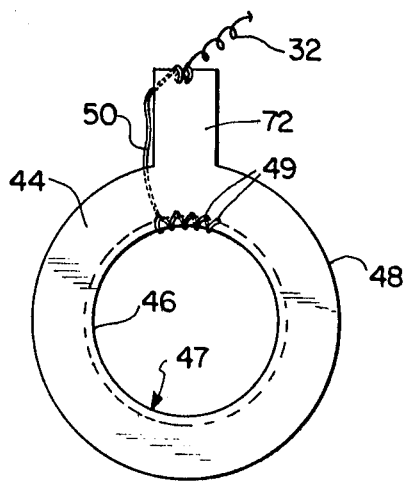
Figure 10:
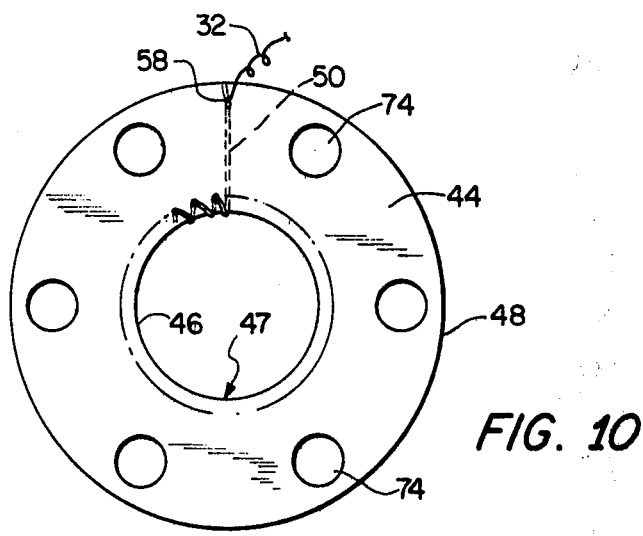

On the other hand, FIG. 9 shows an example in which an annular frame 44 having a grip portion 72 is used for facilitating assembly and connection of the grounding connector 32, whereas FIG. 10 shows an example in which an annular frame 44 having bolt holes 74 is used for fitting a pipe (not shown) having bolt holes in order to connect to the pipeline.

Normally the lead portion of the grounding wire 50, which leads to the outside of the frame 44, is embedded in an adhesive, such as the silicone adhesive, from the standpoint of air-tightness; however, it is also possible to resort to other means, such as those shown in FIGS. 11A to 11F, for example.

Figure 11A:
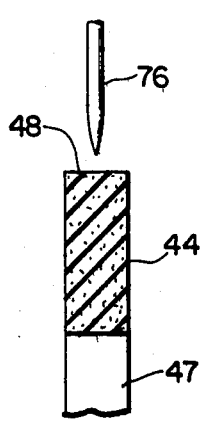
FIGS. 11A to 11F are enlarged sectional views of grounding ring frames for explaining means for enhancing the air-tightness of the end portion of a grounding wire.
Figure 11B:
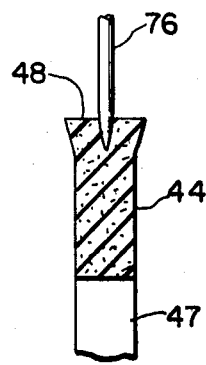
Figure 11C:
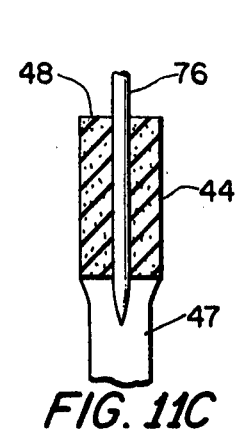
Figure 11D:
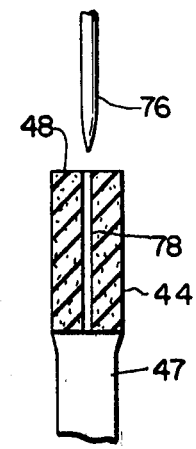
Figure 11E:
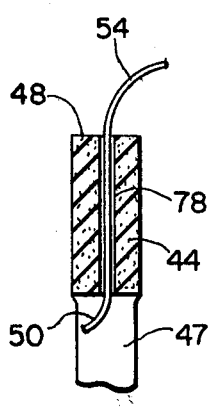
Figure 11F:
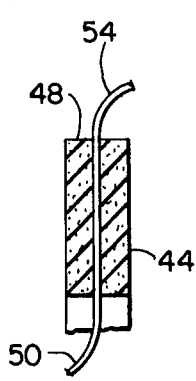

Specifically, as shown in FIGS. 11A to 11D, a needle or a needle-shaped drill 76 is forced from the outside to the inside of the annular frame 44, thereby forming a grounding wire lead-out hole 78. Subsequently, the end portion 54 of the grounding wire 50 as shown in FIG. 11E is inserted into the grounding wire lead-out hole 78. The annular frame 44 is heated to cause shrinking of the plastic material in the step depicted by FIG. 11F until it is restored to its initial state, to thereby enhance the air-tightness. Finally, the end portion 54 is fixed to the grounding attachment means 56 or hole 58, as shown in FIGS. 5 and 6. Generally speaking, because the tetrafluoroethylene resin has typical plastic characteristics, if it is used to make the annular frame 44 it experiences cold flow when extended or contracted in a cold condition by an amount exceeding its elastic limit, until it cannot be restored to its initial state without difficulty when heated. A material having such characteristics is exemplified not only by tetrafluoroethylene but also by polyethylene, soft chloroethylene polymers and so on. Incidentally, materials having so-called "rubber elasticity", such as chloroprene rubber require no heating step. In this case, it is sufficient to sew the thin platinum wire 50, for example, of 0.03 mm, by the use of a hard needle connected to the wire 50 at its end portion (not shown). In either case, the air-tightness can be maintained if a grounding wire 50 thicker than the lead-out hole 78 is forced into the grounding wire lead-out hole 78. In case the grounding wire lead-out hole 78 is bigger than the grounding wire 50, the air-tightness can be ensured by fastening the wire between flanges.

Figure 12:
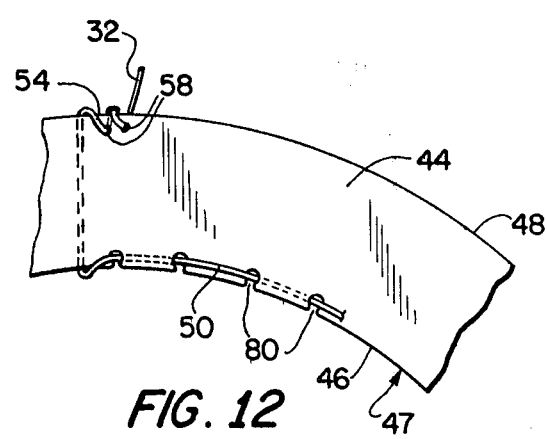
FIG. 12 is an enlarged front view of grounding means according to a further embodiment of the invention.

As shown in FIG. 12, in another embodiment grooves 80 are equidistantly formed in and along the inner peripheral edge of the grounding annular frame 44 and are used to wind the grounding wire 50 through the grooves 80. The grounding wire 50 is exposed to the central opening 47 of the frame 44 through the grooves 80.

The present invention should not be limited to the embodiments thus far described. For example, the grounding wire 50, 60 and 64 may be made not only of platinum but also of another material such as tantalum or silver. Moreover, it is possible to form the grounding wire lead-out hole 78 by preparing a mold with a needle inserted in advance, so that the needle will be embedded when the grounding annular frame 44 is molded, and by subsequently extracting the needle. Moreover, the invention can be put into practice in a variety of modifications without departing from the scope of the invention.

What is claimed is:

1. An electromagnetic flow meter for measuring the flow of a liquid flowing through a pipe, comprising:
    an electromagnetic flow meter body having at least one connecting end for connecting the body to one end of the pipe; and
    a grounding device adapted to be fastened between the connecting end of said body and the end of the pipe, said grounding device comprising (a) an annular frame of an insulating material having an inner periphery defining a central opening and an outer periphery and (b) a grounding wire disposed on said annular frame at least at said inner periphery to be exposed to said central opening of said annular frame.

2. An electromagnetic flow meter according to claim 1, wherein said annular frame has a plurality of holes adjacent to its inner periphery, and said grounding wire is wound across the surface of said inner periphery of said annular frame through said holes.

3. An electromagnetic flow meter according to claim 1, wherein said grounding wire comprises a plurality of grounding wires arranged at opposite portions of said annular frame.

4. An electromagnetic flow meter according to claim 1, wherein said annular frame includes a gripping projection having an anchoring hole therein for anchoring said grounding wire.

5. An electromagnetic flow meter according to claim 1, wherein said annular frame includes a plurality of grooves along its inner periphery, and said grounding wire is wound through said grooves.

6. An electromagnetic flow meter according to claim 1, wherein said annular frame is comprised of material having rubber elasticity and said grounding wire is sewn through said annular frame at said inner periphery to be exposed to said central opening.

7. An electromagnetic flow meter according to claim 1, wherein said grounding wire is attached on the surface of said inner periphery of said frame by means of an adhesive.

8. An electromagnetic flow meter according to claim 7, wherein said grounding wire comprises a plurality of ground wires arranged at a plurality of areas of said inner periphery.

9. An electromagnetic flow meter according to claim 7, wherein said grounding wire comprises one part disposed along said inner periphery and another part disposed radially at the side surface of said annular frame.

10. An electromagnetic flow meter according to claim 1, wherein the outer end of said grounding wire is anchored at the radially outer part of said annular frame.

11. An electromagnetic flow meter according to claim 10, wherein said annular frame includes a hole for anchoring said outer end of said grounding wire.

12. An electromagnetic flow meter according to claim 1, wherein said annular frame is comprised of a highly corrosion resistant plastic.

13. An electromagnetic flow meter according to claim 12, wherein said plastic is selected from the group consisting of a tetrafluoroethylene resin, a monochlorotrifluoroethylene resin, and a copolymer of tetrafluoroethylene and hexafluoroethylene.

14. An electromagnetic flow meter according to claim 1, wherein said grounding wire is comprised of a highly corrosion resistant metal.

15. An electromagnetic flow meter according to claim 14, wherein said metal is selected from the group consisting of platinum and tantalum.

16. An electromagnetic flow meter according to claim 1, wherein said annular frame is comprised of a thermoplastic resin and has a through hole from said inner periphery to said outer periphery for passage of said grounding wire and wherein said grounding wire is fixed in said frame by heat shrinkage of said thermoplastic resin.

17. An electromagnetic flow meter according to claim 16, wherein said thermoplastic resin is selected from the group consisting of a tetrafluoroethylene resin, polyethylene, and a soft tetrafluoroethylene polymer.

* * * * *